United States Patent Office 2,992,544
Patented July 18, 1961

2,992,544
INSOLUBLE RESINOUS COPOLYMERS OF (CHLOROMETHYL)STYRENE AND POLYVINYL AROMATIC HYDROCARBONS AND NITROGEN-CONTAINING DERIVATIVES OF THE COPOLYMERS
Elmer L. McMaster, Midland, Mich., assignor to The Dow Chemical Company, Midland, Mich., a corporation of Delaware
No Drawing. Filed May 9, 1955, Ser. No. 507,130
3 Claims. (Cl. 260—2.1)

This invention relates to improvements in ion exchange materials. It pertains more particularly to insoluble resinous copolymers of (chloromethyl)styrene and polyvinyl aromatic hydrocarbons, and nitrogen-containing derivatives of the copolymers which nitrogenous compositions are suitable for the removal of anions from fluids. The invention relates to a method of making the insoluble copolymers and their nitrogenous derivatives.

United States Patent No. 2,629,710 makes insoluble resinous compositions containing reactive chlorine atoms by chloromethylating insoluble cross-linked copolymers of styrene and divinylbenzene, or copolymers of styrene, ethylvinylbenzene and divinylbenzene, and teaches that the chloromethylated copolymers can be converted to ion exchange resins by reaction with amines. The patentee teaches it is desirable that as many chloromethyl groups as possible be introduced into the insoluble copolymer because the number of such groups determines the number of polar groups that can be introduced into the final product, and the number of polar groups determines the capacity of the resin to absorb ions.

However, the number of chloromethyl groups that can be introduced into the insoluble cross-linked vinyl aromatic copolymers is dependent in part upon the degree of cross-linking, i.e. the proportion of divinylbenzene in the copolymer. A copolymer having a low degree of cross-linking, say containing one percent by weight of chemically combined divinylbenzene, can readily be chloromethylated to form a product containing an average of about one substituent chloromethyl group per aromatic nucleus, whereas a chloromethylated copolymer of a higher degree of cross-linking, say a copolymer of styrene cross-linked with ten percent by weight of divinylbenzene, contains a lesser number of substituent chloromethyl groups per aromatic nucleus in the copolymer. It becomes more difficult to introduce chloromethyl groups into the vinyl aromatic copolymer as the proportion of divinylbenzene in the copolymer is increased from 10 to 20 percent by weight or more.

The aforementioned U.S. Patent No. 2,629,710 teaches that by varying the amount of divinylbenzene used in the preparation of the copolymer, variations can be made in the physical properties of the polymeric material which carry through to the final ion exchange material and which have a marked effect upon its utility. For most purposes, copolymers in which the divinylbenzene component varies from 0.5 to 8 percent on a molar basis, are employed. Copolymers made with from 0.5 to 2 percent of divinylbenzene give finished ion exchange resins of low density and high porosity. Denser resins of lower porosity are obtained by increasing the percentage of divinylbenzene in the copolymer to from 4 to 8 percent.

It is apparent that the use of the insoluble resinous copolymers of monovinyl aromatic hydrocarbons and polyvinyl aromatic hydrocarbons, which copolymers are chloromethylated and are employed for the manufacture of ion exchange resins having desirable characteristics, is restricted not only to the employment of cross-linked copolymers having a narrow range in the degree of cross-linking, e.g. to from about 2 to 8 percent divinylbenzene on a molar basis, but is also limited by the number of substituent chloromethyl radicals that can be introduced into the cross-linked copolymers. There is need of insoluble resinous vinyl aromatic polymers containing reactive chlorine atoms having a wider range in the degree of cross-linking, and capable of being converted to insoluble ion exchange resins, e.g. quarternary ammonium anion exchange resins having high capacity for absorbing anions from fluids.

Among the characteristics which render an ion exchange material, e.g. a quaternary ammonium anion exchange resin, commercially attractive are: (1) a high capacity for absorbing anions from fluids per unit volume of a bed of the resin; (2) a uniform particle size; (3) a good porosity to permit rapid absorption of anions from fluids; (4) a high efficiency for regeneration of the resin; (5) a high operating capacity; (6) a high resistance to breaking, cracking, or spalling of the resin particles; (7) a low loss in ion exchange capacity over long periods of operation; and (8) a low volume change due to shrinkage or swelling of the resin particles during repeated cycles of operation for the absorption of anions from a fluid and displacement of the absorbed ions from the resin by treatment with a regenerant solution. For most purposes a bed of an ion exchange resin should not undergo a change in volume exceeding 20 percent, under operating conditions, and resins which exhibit a smaller change in volume under repeated cycles of operation for the absorption of ions from fluids and regeneration of the resin, are desired.

It has now been found that insoluble resinous cross-linked vinyl aromatic copolymers containing reactive chlorine atoms, and which copolymers are capable of being converted to insoluble anion exchange resins having among their properties the aforementioned characteristics, can readily be obtained by polymerizing a mixture of a major proportion on a molar basis of (chloromethyl)-styrene and a minor proportion of a polyvinyl aromatic hydrocarbon, e.g. divinylbenzene.

It has been found that copolymers of (chloromethyl)-styrene and a polyvinyl aromatic hydrocarbon, e.g. divinylbenzene, containing the latter compound in a wide range of proportions, say from 2 to 20 percent or more on a molar basis, can be employed for making anion exchange resins which exhibit to more or less extent the aforementioned characteristics.

The anion exchange resins prepared from the insoluble resinous cross-linked copolymers of (chloromethyl)styrene and a polyvinyl aromatic hydrocarbon, e.g. divinylbenzene, by reaction of the copolymer in the form of small beads, spheres, or spheroids, with a tertiary amine are surprisingly resistant to breaking, cracking, or spalling, both during the preparation of the anion exchange resin, and in use of the latter for the absorption of anions from fluids. The resin particles appear to be relatively free from internal strains and stresses as compared to the product obtained by chloromethylating a copolymer of styrene and divinylbenzene.

The copolymers of (chloromethyl)styrene and a polyvinyl aromatic hydrocarbon, e.g. divinylbenzene, being free, or substantially free, from internal strains and stresses are suitable for making anion exchange resin in the form of relatively large particles, e.g. beads or spheroids of sizes between 10 and 20 mesh per inch as determined by U.S. Standard screens. For some purposes anion exchange resins of such relatively large particle sizes in the form of beads or spheres are preferred, e.g. for removing complex metal ions from aqueous solutions, or from aqueous clay suspensions. Attempts to prepare strongly basic quaternary ammonium anion exchange resins in the form of beads or spheres of sizes between 10 and about 20 mesh per inch by the heretofore known method of introducing chloromethyl groups as substituents on aromatic nuclei of an insoluble copolymer of styrene and divinylbenzene, then reacting the chloromethylated copolymer with a tertiary amine, results in the formation of a final product wherein a major proportion, if not all, of the larger resin particles are cracked or broken. The method is not satisfactory for the preparation of such anion exchange resins in the form of beads or spheroidal particles of sizes substantially larger than about 20 mesh per inch.

The copolymers of (chloromethyl)styrene and a polyvinyl aromatic hydrocarbon contain the chloromethyl groups on different aromatic nuclei in the copolymer molecule, and in most instances, contain a substantially greater number of chloromethyl groups per aromatic nucleus in the copolymer, than have the insoluble chloromethylated vinyl aromatic polymers such as chloromethylated polystyrene, or chloromethylated copolymers of styrene and divinylbenzene cross-linked with a similar proportion of divinylbenzene. The copolymers of (chloromethyl)styrene and a polyvinyl aromatic hydrocarbon permit the introduction or substitution of a greater number of polar groups, e.g. quaternary ammonium groups, in the copolymer molecule than has heretofore been attained by chloromethylating vinyl aromatic copolymers containing more than about 8 percent on a molar basis of divinylbenzene. The final product, i.e. the anion exchange resins of the invention, have high capacity for the removal of anions from fluids.

The invention provides new cross-linked vinyl aromatic polymers containing chloromethyl radicals on aromatic nuclei in the copolymer molecule which copolymers can readily be converted into anion exchange resins having high capacity for the removal of anions from fluids and having a greater degree of cross-linking and a wider range in the degree of cross-linking than have anion exchange resins heretofore prepared from chloromethylated vinyl aromatic polymers.

The (chloromethyl)styrene to be employed in making the copolymers is preferably meta-, or para-(chloromethyl)styrene. However, any of the isomeric ortho-, meta-, or para-(chloromethyl)styrenes, or mixtures of the isomers can be used. The term "(chloromethyl)styrene" pertains to the isomeric compounds of the formula $CH_2=CH \cdot C_6H_4 \cdot CH_2Cl$.

The polyvinyl aromatic hydrocarbon to be employed as a cross-linking agent in preparing the copolymers can be divinylbenzene, divinyltoluene, divinylxylene, divinylethylbenzene, divinylethyltoluene, or trivinylbenzene. Divinylbenzene is the preferred polyvinyl aromatic hydrocarbon. It is usually obtained as a liquid fraction consisting principally of divinylbenzene in admixture with a minor proportion of ethylvinylbenzene. The latter compound is of no benefit as a cross-linking agent, but its presence in minor amount is not disadvantageous. The polymeric compositions, i.e. the copolymers of the invention, may also contain in chemically combined form a small amount, e.g. 10 percent by weight or less, of one or more other polymerizable vinylidene compounds such as styrene, vinyltoluene, vinylxylene, ethyl acrylate, methyl methacrylate, methyl isopropenyl ketone, vinyl chloride, or alpha-methylstyrene.

The copolymers may contain from 0.5 to 50, preferably from 2 to 25, percent on a molar basis, of the polyvinyl aromatic hydrocarbon chemically combined with from 99.5 to 50, preferably from 98 to 75, percent of the (chloromethyl)styrene.

The copolymers can be prepared in usual ways such as by polymerization of a mixture of the monomers in mass or suspension in a liquid that is not a solvent for the monomeric material. Suspension polymerization, in which the monomers are first suspended in a liquid non-solvent for the monomers such as glycerine, water, or brine and are then heated, agitated and copolymerized, or in which the monomers are scattered as droplets throughout a thickened aqueous medium such as a suspension of bentonite and water having a consistency sufficient to immobilize and prevent the droplets from coalescing, and are then heated without agitating and copolymerized, are preferred. Such methods yield hard copolymers in the form of small spheres, globules, spheroids, or beads, and the size of the particles can be regulated and controlled. The polymerization is usually carried out at temperatures between 20° and 110° C., and lower or higher polymerization temperatures can be employed.

The polymerization is accelerated by means of well known catalysts which provide oxygen. Examples of suitable catalysts are lauroyl peroxide, acetyl peroxide, benzoyl peroxide, stearyl peroxide, di-tert.-butyl peroxide, di-tert.-butyl diperphthalate, tert.-butyl perbenzoate, or cumene hydroperoxide. The catalysts are employed in amounts ranging from 0.1 to 2 percent by weight of the material to be copolymerized.

The copolymers are converted to ion exchange resins by reacting particles of the insoluble copolymers with a nitrogen-containing base such as a primary-, secondary-, or tertiary amine. The reaction can be carried out by adding the amine to the copolymer while the latter is suspended and agitated in a liquid which is a solvent for the amine, e.g. water, benzene, toluene, chlorobenzene, or perchloroethylene. The finely divided copolymer can be suspended in the liquid amine, in which case no other liquid need be used. The mixture may be allowed to react at room temperature, or preferably elevated temperatures, e.g. at from 25° to 120° C. and at atmospheric or superatmospheric pressures. The copolymer is usually swelled prior to its reaction with the nitrogen-containing base by soaking the particles of the copolymer in a suitable liquid such as benzene, toluene, chloroform, carbon tetrachloride, methylene chloride, perchloroethylene, etc., at ordinary temperatures or above.

The nitrogen-containing base to be employed in making the anion exchange resins can be a primary-, secondary-, or tertiary amine. Examples of suitable amines are methylamine, ethylamine, butylamine, dimethylamine, diethylamine, dipropylamine, ethylendiamine, diethylenetriamine, trimethylamine, triethylamine, tributylamine, dimethylethanolamine, methyldiethanolamine, dimethylisopropanolamine, methyldiisopropanolamine, benzyldimethylamine, or diethylcyclohexylamine.

It may be mentioned that primary-, or secondary amines form weakly basic anion exchange resins containing amino groups, whereas tertiary amines, e.g. trimethylamine or dimethylethanolamine, form strongly basic quaternary ammonium anion exchange resins. The latter resins are capable of absorbing anions such as chloride, sulfate, or hydroxyl ions from aqueous solutions, and are preferred.

The following examples illustrate ways in which the principle of the invention has been applied, but are not to be construed as limiting its scope.

EXAMPLE 1

(A) A mixture of 360 grams of (chloromethyl)styrene, 32 grams of divinylbenzene and 8 grams of ethylvinylbenzene, together with 2.4 grams of benzoyl peroxide as polymerization catalyst, was suspended in two liters of an aqueous solution containing 480 grams of sodium chloride and 2 grams of methyl cellulose (4000 cps.). The mixture was stirred and heated at a temperature of 65° C. for one hour, then heated at 70° C. with stirring for a period of 6 hours. The copolymer was separated by filtering and was washed with water and dried. The copolymer was in the form of hard beads of sizes between 20 and 50 mesh per inch as determined by U.S. Standard screens. The copolymer beads contained 19.9 percent by weight of chlorine by analysis.

(B) A charge of 17.3 grams (25 cc.) of the coplymer beads prepared in part (A) above was suspended in perchloroethylene and heated at a temperature of 80° C.

for one hour to swell the beads. The swollen beads were separated by filtering and were mixed with 334 grams of an aqueous 25 weight percent solution of trimethylamine. The mixture was stirred and heated under reflux temperatures of up to 90° C. for a period of 4 hours. The resin was separated by filtering and was washed with water. The wet resin beads had a volume of 57.5 cc. The beads were in the form of an insoluble resinous quaternary ammonium chloride composition. The resin had an anion exchange capacity corresponding to 31.5 kilograins of calcium carbonate per cubic foot of a bed of the water-wet resin beads.

EXAMPLE 2

A charge of 320 grams of para-(chloromethyl)styrene and 38 grams of a liquid fraction consisting of 80 percent by weight of divinylbenzene and about 20 percent of ethylvinylbenzene, together with 2 grams of lauroyl peroxide as polymerization catalyst, was added to 125 cc. of an aqueous solution of 99.91 percent by weight of water, 0.03 percent of a water-soluble condensation product of diethanolamine and adipic acid, 0.03 percent of a water soluble reaction product of an ethylene oxide-urea condensation product with formaldehyde, and 0.03 percent of bentonite. The mixture was vigorously stirred to disperse the monomer as droplets in the aqueous medium. Thereafter, there was added with gentle stirring 11.3 cc. of an aqueous one percent by weight copper sulfate solution and 480 cc. of an aqueous 4 weight percent dispersion of bentonite in water. The resulting dispersion comprising the droplets of monomer scattered throughout the thickened aqueous medium was sealed in a glass bottle and heated without agitating at a temperature of 50° C. for a period of 14 hours, then at 80° C. for 6 hours, to polymerize the monomers. Thereafter, the copolymer was separated and was washed with water and dried. There was obtained 343 grams of coplymer in the form of beads of sizes between 30 and 50 mesh per inch as determined by U.S. Standard screens. The copolymer contained 19.9 percent by weight of chlorine. A charge of 325 grams of the copolymer was dispersed in liquid perchloroethylene and heated at a temperature of 80° C. for one hour to swell the beads. The perchloroethylene was decanted and 1200 cc. of an aqueous 25 weight percent solution of trimethylamine added. The mixture was stirred and heated gradually to a temperature of 90° C. in a period of about 0.5 hour, then heated at 90° C. for 3.5 hours longer. The resin was separated, was washed with water, then with acetone and again washed with water. The resin had an anion exchange capacity corresponding to 34.4 kilograins of calcium carbonate per cubic foot of a bed of the wet resin.

EXAMPLE 3

A copolymer of 87.7 percent by weight of (chloromethyl)styrene, 9.8 percent of divinylbenzene and 2.5 percent of ethylvinylbenzene was prepared by procedure similar to that described in Example 2. The copolymer was in the form of rounded beads of sizes between 20 and 60 mesh per inch. A portion of the copolymer was swelled in perchloroethylene and the swollen copolymer reacted with trimethylamine employing procedure similar to that employed in Example 2. The resin had an anion exchange capacity corresponding to 33.7 kilograins of calcium carbonate per cubic foot of a bed of the wet resin.

Another portion of the coplyomer beads was swelled in perchloroethylene and reacted with dimethylethanolamine by heating the swollen beads with an aqueous 60 weight percent dimethylethanolamine solution at a temperature of 90° C. for a period of 4 hours. The resin was separated, was washed with water, then with acetone and again washed with water. The resin had an anion exchange capacity corresponding to 36.2 kilograins of calcium carbonate per cubic foot of a bed of the wet resin.

EXAMPLE 4

A charge of 80 grams of (chloromethyl)styrene (98.2 percent) and 3.4 grams of a liquid fraction consisting of 97 percent by weight of divinylbenzene and 3 percent of ethylvinylbenzene, together with 0.42 gram of lauroyl peroxide as catalyst, was polymerized employing procedure similar to that described in Example 2. The copolymer was in the form of rounded beads of sizes from 20 to 50 mesh per inch. The copolymer was swelled in perchloroethylene, then mixed with 500 grams of ethylenediamine. The mixture was stirred and heated at temperatures between 88° and 107° C. over a period of 4 hours. The resin was separated and was washed with water. It was washed with a dilute aqueous solution of hydrochloric acid, was washed with an aqueous 1-normal sodium hydroxide solution and rinsed with water until free from sodium hydroxide. The resin had an anion exchange capacity corresponding to 61.7 kilograins of calcium carbonate per cubic foot of a bed of the wet resin.

EXAMPLE 5

In each of a series of experiments, a mixture of chloromethyl styrene and a technical divinylbenzene similar to that described in EXAMPLE 2, in proportions as stated in the following Table was suspended in an aqueous medium and polymerized employing procedure similar to that described in Example 2. The copolymer was obtained in the from of insoluble hard resinous particles of sizes between 20 and 50 mesh per inch as determined by U.S. Standard screens. The percent of chlorine in the copolymer was determined by analysis. A swelling characteristic for the copolymer was determined by suspending a measured volume of the dry copolymer particles in chloroform at 25° C. for a period of 2 hours and measuring the volume of the swollen beads. The swelling characteristic is calculated by dividing the volume in cubic centimeters of the swollen beads by the volume in cubic centimeters of the dry beads. Other portions of the dry copolymer were suspended in perchloroethylene at a temperature of 80° C. for one hour to swell the beads. The perchloroethylene was drained from the swollen copolymer. The swollen copolymer was suspended in an aqueous 25 weight percent solution of trimethylamine solution. The mixture was heated at a temperature of 80° C. in a closed container for a period of 4 hours. Thereafter, the resin was separated by filtering and was washed with water, then with acetone and again washed with water. The product was an insoluble resinous quaternary ammonium composition containing trimethyl ammonium chloride groups of the formula $-CH_2 \cdot NCl(CH_3)_3$ as substituents on aromatic nuclei of the copolymer. It was an anion exchange resin. A weighed portion of the product was dried by heating the same at a temperature of 50° C. at an absolute pressure of 10 millimeters for a period of 3 hours. It was then weighed to determine the percent of water in the resin granules. A swelling characteristic for the anion exchange resin was determined by immersing a measured volume of the dried anion exchange resin granules in water for a period of one hour and thereafter measuring the volume of the water-swollen resin particles. The swelling characteristic for the anion exchange resin was calculated by dividing the volume in cubic centimeters of the water-swollen resin particles by the volume in cubic centimeters of the dry anion exchange resin initially used. An anion exchange capacity for the resin was also determined. The table identifies the copolymer by giving the proportions of chloromethylstyrene and divinylbenzene employed in preparing the same. The table gives the percent by weight of chlorine in the copolymer and a swelling ratio for the copolymer in chloroform at 25° C. The table gives the anion exchange capacity of the final product in milli-equivalents per gram of the dry resin, a swelling ratio for the chloride form of the anion exchange resin in water at 25° C., and the percent by weight of water in the swollen resin granules. The table also gives the anion exchange capacity in kilograins of calcium carbonate per cubic foot of a bed of the water-immersed anion exchange resin.

mer beads was suspended in perchloroethylene and swelled by heating the suspension at a temperature of 60° C. for one hour. The perchloroethylene was drained from the beads and 200 grams of an aqueous 25 weight percent solution of trimethylamine added. This mixture was stirred and heated under reflux at temperatures up to 90° C. for a period of 4 hours. The resin was sep- Table

| Run No. | Starting materials | | Copolymer | | Product | | | |
|---|---|---|---|---|---|---|---|---|
| | (Chloromethyl) styrene, weight percent | Divinylbenzene, weight percent | Chlorine, percent | Swelling ratio in $CHCl_3$ | Capacity, meq./gm. (dry) | Swelling ratio in $H_2O$ | Water in resin, percent | Capacity, kilogr. $CaCO_3$/cu. ft. (wet) |
| 1 | 99.5 | 0.5 | 21.27 | 5.6 | 2.21 | 11.5 | 87.7 | 5.7 |
| 2 | 98 | 2 | 20.65 | 3.2 | 3.26 | 5.61 | 73.8 | 14.2 |
| 3 | 96 | 4 | 20.35 | 2.5 | 3.32 | 2.07 | 54.8 | 22.9 |
| 4 | 94 | 6 | 19.88 | 2.1 | 3.58 | 1.88 | 52.3 | 28.6 |
| 5 | 92 | 8 | 19.48 | 1.9 | 3.88 | 1.87 | 48.5 | 33.0 |
| 6 | 90 | 10 | 18.82 | 1.7 | 3.58 | 1.70 | 43.2 | 34.7 |
| 7 | 88 | 12 | 18.54 | 1.7 | 3.54 | 1.67 | 40.4 | 36.2 |
| 8 | 86 | 14 | 17.71 | 1.7 | 3.35 | 1.54 | 38.2 | 36.2 |
| 9 | 84 | 16 | 17.28 | 1.7 | 3.27 | 1.54 | 35.2 | 37.2 |
| 10 | 82 | 18 | 17.01 | 1.6 | 3.23 | 1.50 | 33.4 | 34.1 |

EXAMPLE 6

A charge of 20 grams of a copolymer of 93 percent chloromethyl styrene and 7 percent divinylbenzene on a molar basis, in the form of beads of sizes between 12 and 16 mesh per inch as determined by U.S. Standard screens was suspended in perchloroethylene at 80° C. and swelled. The copolymer starting material contained 19.1 percent by weight of chlorine. The excess perchloroethylene was drained from the beads. A charge of 200 grams of an aqueous 25 weight percent solution of trimethylamine was added. The mixture was stirred and heated under reflux to a temperature of 90° C. in a period of one hour, then was heated with stirring at 90° C. for three hours longer. Thereafter, the resin was separated by filtering, was washed with water, then with acetone and again washed with water. The product was an anion exchange resin. Ninety-six percent of the water-swollen resin granules were in the form of beads of sizes greater than 12 mesh per inch.

For purpose of comparison, a charge of 19 grams of a copolymer of 88 percent styrene, 5 percent ethylvinylbenzene and 7 percent divinylbenzene on a molar basis, in the form of beads of sizes between 12 and 16 mesh per inch was placed in a glass reaction vessel equipped with a reflux condenser and stirrer, together with 38 grams of perchloroethylene. Thereafter, 57 grams of chloromethyl methyl ether was added. The mixture was heated at a temperature of 55° C. for one hour. It was stirred and 9.6 grams of anhydrous zinc chloride was added. The resulting mixture was stirred and heated at temperatures between 54° and 57° C. for 4 hours. Thereafter, the copolymer was separated and was washed and dried. The chloromethylated copolymer contained 15.03 percent by weight of chlorine. At this stage of the process the beads were not cracked or broken.

A charge of 10 grams of the chloromethylated copolymer beads was suspended in perchloroethylene and arated and was washed with water. It was an anion exchange resin. All of the resin particles were cracked or broken and were of sizes such that 96.3 percent by volume of the water-swollen particles passed through a 16 mesh per inch U.S. Standard screen.

I claim:

1. A resinous composition in the form of discrete particles and suitable for the removal of anions from fluids, which comprises the reaction product of a copolymer prepared by polymerizing a mixture of from 75 to 90 percent of ar-(chloromethyl)styrene and from 25 to 10 percent of divinylbenzene, on a molar basis, said copolymer being in the form of discrete particles, and a tertiary amine selected from the group consisting of trimethylamine and dimethylethanolamine.

2. A resinous composition in the form of discrete particles and suitable for the removal of anions from fluids, which comprises the reaction product of a copolymer prepared by polymerizing a mixture of from 75 to 90 percent of ar-(chloromethyl)styrene and from 25 to 10 percent of divinylbenzene, on a molar basis, said copolymer being in the form of discrete particles, and trimethylamine.

3. A resinous composition in the form of discrete particles and suitable for the removal of anions from fluids, which comprises the reaction production of a copolymer prepared by polymerizing a mixture of from 75 to 90 percent of ar-(chloromethyl)styrene and from 25 to 10 percent of divinylbenzene, on a molar basis, said polymer being in the form of discrete particles, and dimethylethanolamine.

References Cited in the file of this patent

UNITED STATES PATENTS

| 2,629,710 | McBurney | Feb. 24, 1953 |
| 2,631,127 | D'Alelio | Mar. 10, 1953 |
| 2,780,604 | Clarke et al. | Feb. 5, 1957 |